US008057086B2

(12) United States Patent
Kim et al.

(10) Patent No.: US 8,057,086 B2
(45) Date of Patent: *Nov. 15, 2011

(54) LIGHT GUIDE UNIT FOR POINT LIGHT SOURCE, BACKLIGHT ASSEMBLY HAVING THE LIGHT GUIDE UNIT AND DISPLAY DEVICE HAVING THE SAME

(75) Inventors: Hwan-Jin Kim, Seongnam-si (KR); Sang-Hee Lee, Yongin-si (KR); Kyoung-Don Lee, Suwon-si (KR); Se-In Chang, Suwon-si (KR); Jae-Kwang Kim, Seoul (KR); In-Hyuk Choi, Seoul (KR); Wal-Hee Kim, Yongin-si (KR); Jae-Lok Cha, Goyang-si (KR); Ji-Hwan Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/725,644

(22) Filed: Mar. 17, 2010

(65) Prior Publication Data

US 2010/0172155 A1    Jul. 8, 2010

Related U.S. Application Data

(63) Continuation of application No. 12/339,479, filed on Dec. 19, 2008, now Pat. No. 7,708,443, which is a continuation of application No. 11/503,784, filed on Aug. 14, 2006, now Pat. No. 7,484,875.

(30) Foreign Application Priority Data

Oct. 20, 2005 (KR) .................. 10-2005-0098959

(51) Int. Cl.
*F21V 8/00* (2006.01)
*F21V 7/04* (2006.01)

(52) U.S. Cl. ........ 362/612; 362/609; 362/611; 362/613; 362/621; 362/623

(58) Field of Classification Search .................. 362/609, 362/621, 623, 611–613
See application file for complete search history.

(56) References Cited

U.S. PATENT DOCUMENTS

| 6,139,163 | A | 10/2000 | Satoh et al. | |
|---|---|---|---|---|
| 6,676,268 | B2 | 1/2004 | Ohkawa | |
| 6,950,154 | B2 * | 9/2005 | Lee | 349/58 |
| 7,063,450 | B2 | 6/2006 | Ehara et al. | |
| 7,188,987 | B2 | 3/2007 | Yu | |

(Continued)

FOREIGN PATENT DOCUMENTS

| CN | 1542522 A | 11/2004 |
|---|---|---|
| WO | 0050807 A1 | 8/2000 |

*Primary Examiner* — Stephen F Husar
*Assistant Examiner* — James Cranson, Jr.
(74) *Attorney, Agent, or Firm* — Cantor Colburn LLP

(57) ABSTRACT

A light guide unit for a point light source includes a light incident portion, a first reflecting portion and a second reflecting portion. The light emitted from the point light source enters to the light incident portion. The light incident portion includes an optical pattern diffusing an incident light corresponding to the point light source. The first reflecting portion reflects a first light of the incident light. The second reflecting portion roundly connects the first reflecting portion to the light incident portion and reflects a second light of the incident light.

14 Claims, 12 Drawing Sheets

U.S. PATENT DOCUMENTS

| | | | | |
|---|---|---|---|---|
| 7,360,942 B2 * | 4/2008 | Kim et al. | | 362/632 |
| 7,484,875 B2 | 2/2009 | Kim et al. | | |
| 7,708,443 B2 * | 5/2010 | Kim et al. | | 362/612 |

| | | |
|---|---|---|
| 2002/0163790 A1 | 11/2002 | Yamashita et al. |
| 2003/0117789 A1 | 6/2003 | Nowak |
| 2006/0072339 A1 | 4/2006 | Li et al. |

* cited by examiner

LIGHT GUIDE UNIT FOR POINT LIGHT SOURCE, BACKLIGHT ASSEMBLY HAVING THE LIGHT GUIDE UNIT AND DISPLAY DEVICE HAVING THE SAME

This application is a continuation application of U.S. application Ser. No. 12/339,479 filed Dec. 19, 2008, which is a continuation application of U.S. application Ser. No. 11/503,784 filed Aug. 14, 2006 and issued as U.S. Pat. No. 7,484,875 on Feb. 3, 2009, which claims priority to Korean Patent Application No. 2005-98959 filed on Oct. 20, 2005 and all the benefits accruing therefrom under 35 USC §119, the contents of which are herein incorporated by reference in their entireties.

BACKGROUND OF THE INVENTION

1. Field of the Invention

Exemplary embodiments of the present invention relate to a light guide unit for a point light source, a backlight assembly and a display device having the light guide unit. More particularly, exemplary embodiments of the present invention relate to a light guide unit for a point light source having an improved light efficiency, a backlight assembly and a display device having the same.

2. Description of the Related Art

Electronic devices such as a cellular phone, a digital camera, a notebook computer, a monitor and the like include a display device to display data into images. A liquid crystal display (LCD) device is widely used as the display device since the LCD device has merits such as a thin thickness and a light weight.

The LCD device includes a crystal and a backlight assembly for displaying images. The backlight assembly provides a light into a display panel in order to display the images using a small amount of light. The backlight assembly includes a light source and an optical unit for improving optical characteristics of a light emitted from the light source. Particularly, structure of the light source and the optical unit, and an arrangement relationship may have the most important influence on power consumption, lightening and the thinning of the LCD device. In order to reduce the power consumption, weight, thickness and volume of the LCD device, attempts to improve a structure of the backlight assembly has been continued.

The LCD device applied to the notebook computer or the monitor generally includes a cold cathode fluorescent lamp (CCFL) as a light source of the backlight assembly. However, the LCD device applied to a smaller device such as the cellular phone and the digital camera includes a point light source as a light source of the backlight assembly.

The point light source may include a light emitting diode (LED). The LED has power consumption, a weight, a thickness and a volume smaller than those of the CCFL. Hence, the LED is advantageous for a mobile or smaller display device. The LED may be disposed directly under a display section of a display pane, which is referred to a direct type. Alternatively, the LED may be disposed outside of the display section, which is referred to an edge type.

In a case of the direct type, the optical unit includes a diffusing plate that improves a luminance uniformity of a light emitted from the LED and a light-condensing sheet that improved a luminance of a front. In a case of the edge type, the optical unit includes a light guide plate, a diffusing sheet and a light-condensing sheet. The light guide plate may guide a light emitted from the LED into the display section. The diffusing sheet may diffuse a light exiting from the light guide plate. The light-condensing sheet may condense the light in a direction of a perpendicular of the display panel.

Several LEDs may be used for a mobile display device or a smaller display device. However, using one or two LEDs having a high illumination may be advantageous to reduce the power consumption, thickness and weight. When a single LED is used to the edge type, the LED is usually disposed on an edge of the light guide unit for an efficient diffuse of a light. Then, a light emitted from the LED may proceed in a direction of a diagonal line of the light guide unit and may be guided to the display panel disposed on the light guide unit.

When the backlight assembly includes two or more LEDs, the LEDs are disposed on a side surface of the light guide unit (referred to a light incident portion hereinafter). A portion having a highest luminance of the light guide unit is near the light incident portion. A luminance in a side portion of the display panel may be excessively high in the backlight assembly including the above-mentioned structure, so that a quality of a display may be deteriorated.

In order to improve uniformity of luminance, the light incident portion of the light guide unit is disposed apart by a predetermined interval from an outside of the display section of the display panel. As a result, the light guide unit has a rectangular shape having a longer side than that of the display section. The two or more LEDs are mounted on the light incident portion disposed outside of the display section.

A means to improve a use efficiency of a light emitted from the LED is related with respect to reduce the power consumption and improve the quality of the display.

An amount of a light incident through the light incident portion may be leaked out through a side surface connected to the light incident portion. Particularly, most of the light incident through the light incident portion may not be totally reflected but be leaked out through the side surface connected to the light incident portion because of an arrangement structure between the side surface and the light incident portion. A light leaked out may not be guided to the display section, so that the power consumption of the display device may be wasted and the quality of display may be deteriorated.

BRIEF SUMMARY OF THE INVENTION

Exemplary embodiments provide a light guide unit for a point light source having an improved light efficiency.

Exemplary embodiments provide a backlight assembly having the light guide unit.

Exemplar embodiments provide a display device having the light guide unit.

In an exemplary embodiment, there is provided a light guide unit for a point light source. The light guide unit for the point light source includes a light incident portion where a light emitted from the point light source enters, the light incident portion including an optical pattern that diffuses an incident light and corresponds to the point light source, a first reflecting portion reflecting a first light of the incident light entered through the light incident portion and a second reflecting portion roundly connecting the first reflecting portion to the light incident portion and reflecting a second light of the incident light.

In an exemplary embodiment, the second light may have an exit angle from the point light source substantially greater than an exit angle of the first light, the exit angles taken relative to a direction perpendicular to the light incident portion.

In an exemplary embodiment, the second reflecting portion may have a profile totally reflecting the second light.

In an exemplary embodiment, the light incident portion may be orthogonal to the first reflecting portion.

In an exemplary embodiment, the light guide unit further includes a light exiting portion exiting a guided light connected to the light incident portion, the first reflecting portion and the second reflecting portion and a counter portion opposite to the light exiting portion may be further included.

In an exemplary embodiment, the first reflecting portion may include a first side surface and a second side surface, the first and the second side surfaces being opposite to each other and connect the light exiting portion to the counter portion The second reflecting portion may include a first round surface and a second round surface, the first round surface connecting the first side surface to the light incident portion and the second round surface connecting the second side surface to the light incident portion.

In another exemplary embodiment, a backlight assembly is provided. The backlight assembly includes a point light source emitting a light and a light guide unit for the point light source. The light guide unit includes a light incident portion, a first reflecting portion and a second reflecting portion. The light incident portion includes an optical pattern that diffuses an incident light corresponding to the point light source. The first reflecting portion is perpendicular to the light incident portion and reflects a first light of the incident light entered through the light incident portion. The second reflecting portion roundly connects the first reflecting portion to the light incident portion and reflects a second light of the incident light.

In an exemplary embodiment, the second reflecting portion may have a profile totally reflecting the second light having an exit angle substantially greater than that of the first light emitted from the point light source, the exit angles taken relative to a direction perpendicular of the light incident portion.

In an exemplary embodiment, the light guide unit for the point light source may further include a light exiting portion exiting a guided light, the light exiting portion connected to the light incident portion, the first reflecting portion and the second reflecting portion and a counter portion opposite to the light exiting portion.

In an exemplary embodiment, the first reflecting portion may include a first side surface and a second side surface, the first and the second side surfaces facing each other and connecting the light exiting portion to the counter portion. The second reflecting portion may include a first round surface and a second round surface, the first round surface connecting the first side surface to the light incident portion and the second round surface connecting the second side surface to the light incident portion.

In another exemplary embodiment, there is provided a display device. The display device includes a point light source emitting a light, a display panel having a display section where images are displayed using the light and a light guide unit for the point light source. The light guide unit includes a light incident portion, a light exiting portion, a counter portion, a first reflecting portion and a second reflecting portion. The light incident portion includes an optical pattern that diffuses an incident light corresponding to the point light source. The light exiting portion corresponds to the display section. The counter portion faces the light exiting portion. The first reflecting portion connects the light exiting portion to the counter portion and the second reflecting portion is roundly extended from the first reflecting portion and connects the light incident portion.

In an exemplary embodiment, the first reflecting portion may include a first side surface and a second side surface, the first and the second side surfaces being opposite to each other and connecting the light exiting portion to the counter portion. The second reflecting portion may include a first round surface and a second round surface, the first round surface connecting the first side surface to the light incident portion and the second round surface connecting the second side surface to the light incident portion.

In an exemplary embodiment, the first and the second round surfaces may have profiles totally reflecting a light entered through the light incident portion and directly incident into the first and the second round surfaces.

In an exemplary embodiment, the first and the second round surfaces may be disposed outside of the display section.

In an exemplary embodiment, leakage of a light emitted from a point light source may be reduced or effectively prevented because of the shape of a light guide unit. Advantageously, a power consumption of a backlight assembly may be reduced and a quality of a display device including the backlight assembly may be improved.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
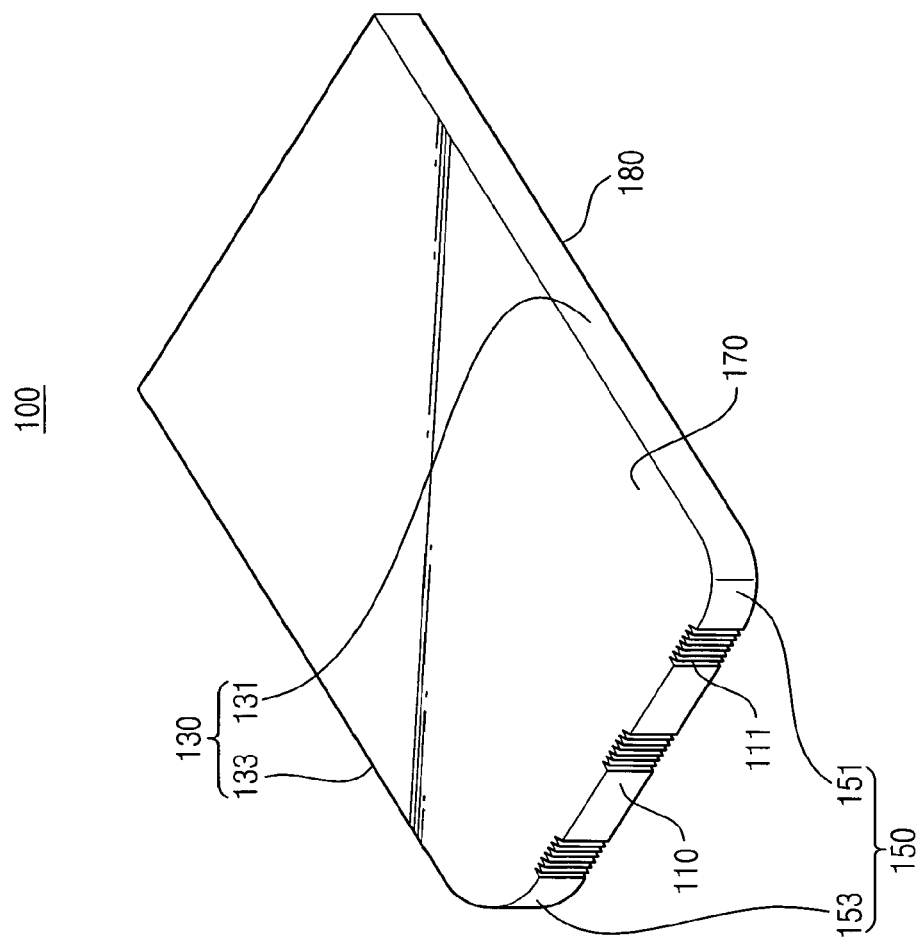
FIG. 1 is a perspective view illustrating an exemplary embodiment of a light guide unit for a point light source in accordance with the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view illustrating an exemplary embodiment of a light guide unit for a point light source in accordance with the present invention.

Referring to FIG. 1, a light guide unit 100 for a point light source may have substantially a plate shape and may guide a light emitted from the point light source. In an exemplary embodiment, the point light source may include, but is not limited to, a light emitting diode (LED).

The light guide unit 100 may include a polymer resin having a good transmissivity, thermal resistance, chemical resistance and mechanical strength, etc. In exemplary embodiments, the polymer resin may include polymethylmethacrylate, polyamide, polyimide, polypropylene, polyurethane, etc. In one exemplary embodiment of the present invention, the light guide unit 100 may have a refractive index of about 1.59.

The light guide unit 100 includes a light incident portion 110, a first reflecting portion 130 and a second reflecting portion 150. A light emitted from the point light source may be entered to the light incident portion 110. The light incident portion 110 corresponds to a portion of a side surface of the light guide unit 100. The light incident portion 110 may include an optical pattern 111 for diffusing a light. In one exemplary embodiment, the optical pattern 111 may include a prism pattern.

The light guide unit 100 further includes a light exiting portion 170 and a counter portion 180. The light exiting portion 170 may be connected to the light incident portion 110 and may exit a guided light. The counter portion 180 is opposite to the light exiting portion 170.

The first reflecting portion 130 may reflect a first light of a light entered through the light incident portion 110, so that leakage of the first light from the light guide unit 100 may be reduced or effectively prevented. The first reflecting portion 130 includes a first side surface 131 and a second side surface 133. The first side surface 131 may connect the light exiting portion 170 to the counter portion 180. The second side surface 133 may be opposite to the first side surface 131 and may connect the light exiting portion 170 to the counter portion 180. The first and the second side surfaces 131 and 133 may be connected to the light incident portion 110 through the second reflecting portion 150. The first and second side surfaces 131 and 133 may be substantially perpendicular to the light incident portion 110, respectively.

Figure 2:
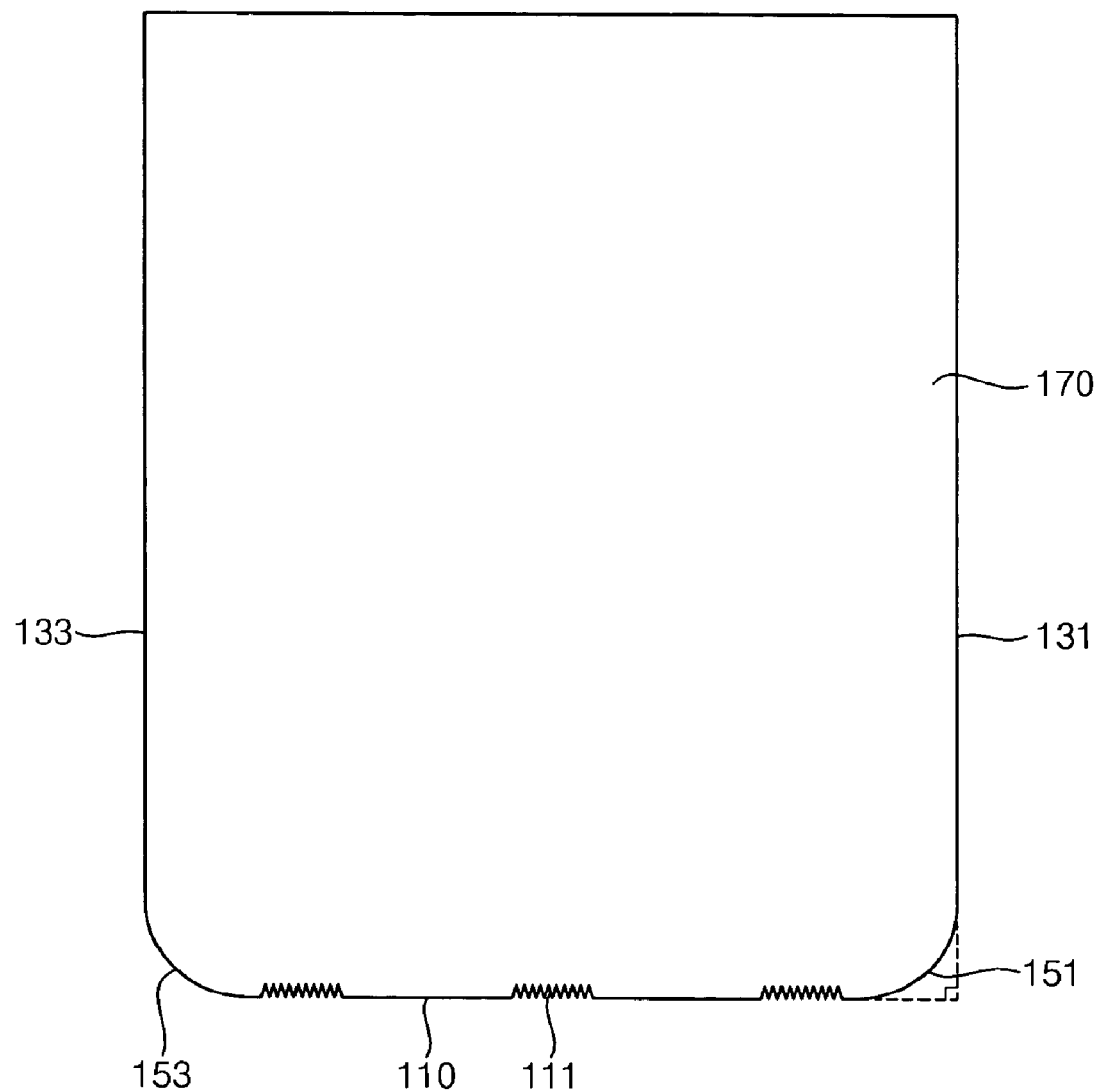
FIG. 2 is a plan view illustrating the light guide unit for a point light source illustrated in FIG. 1.

FIG. 2 is a plan view illustrating the light guide unit for a point light source illustrated in FIG. 1.

Referring to FIGS. 1 and 2, the second reflecting portion 150 is extended from the first reflecting portion 130 and connected to the light incident portion 110. In one exemplary embodiment, the second reflecting portion 150 may include a first substantially rounded surface 151 and a second substantially rounded surface 153.

The first round surface 151 is roundly extended from the first side surface 131 and is connected to a first portion of the light incident portion 110. The second round surface 153 is roundly extended from the second side surface 133 and is connected to a second portion of the light incident portion 110. The second portion is opposite to the first portion of the light incident portion 110. The first and second round surfaces 151 and 153 may have profiles effectively totally reflecting a first light incident to the first and second round surfaces 151 and 153 of a light entered through the light incident portion 110.

In one exemplary embodiment, when the light guide unit 100 has a refractive index of about 1.59, for a light proceeding within the light guide unit 100 in order to be totally reflected from the first and second side surfaces 131 and 133, the first and second round surfaces 151 and 153 and/or the light incident portion 110, the light may have a critical angle of about 38 degrees from the Snell's law.

In comparison to when the first and second side surfaces 131 and 133 are directly connected to the light incident portion 110, an incident angle of a light to the first and second round surfaces 151 and 153 may increase because of the profiles of the first and second round surfaces 151 and 153, when the light proceeds within the light guide unit 100 and is incident to the first and second round surfaces 151 and 153. Accordingly, an intensity of a light incident to the first and second round surfaces 151 and 153 and having an angle more than the critical angle may increase. Advantageously, an intensity of a light totally reflected from the first and second round surfaces 151 and 153 may also increase.

The second reflecting portion 150 may reduce or effectively prevent a light induced through the light incident portion 110 and incident into the second reflecting portion 150 from leaking out through the second reflecting portion 150.

Figure 3:
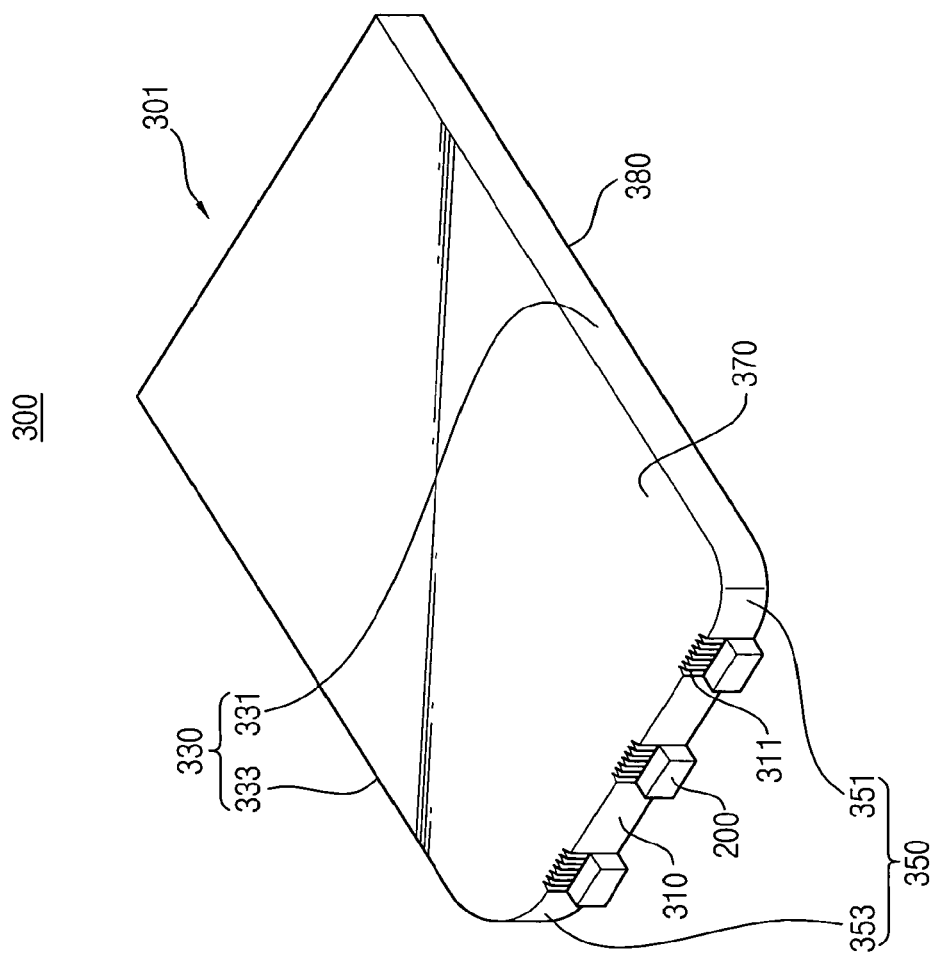
FIG. 3 is a perspective view illustrating an exemplary embodiment of a backlight assembly in accordance with the present invention.

FIG. 3 is a perspective view illustrating an exemplary embodiment of a backlight assembly in accordance with the present invention.

Referring to FIG. 3, a backlight assembly 300 includes a point light source 200 and a light guide unit 301.

In one exemplary embodiment, the point light source 200 may include a light emitting diode (LED) and/or the backlight assembly 300 may include three point light sources 200. A quantity of the point light source 200 may be changed. In one exemplary embodiment, the point light source 200 may emit a white light. In another exemplary embodiment, the point light source 200 may emit a red light, a green light and/or a blue light.

The point light source 200 may include, but is not limited to, a light emitting element formed using a material such as gallium nitride (GaN) and/or red, green and blue fluorescent bodies packed in the light emitting element. The point light source 200 may emit a white light since lights emitted from the red, the green and the blue fluorescent bodies are mixed.

A light emitted from the point light source 200 may have an exit angle in a range of about 70 degrees to about 75 degrees, the exit angle taken relative to a direction substantially perpendicular to the light incident portion 310. The light emitted from the point light source 200 may be considered to generally go straight. The point light source 200 may fanwise emit the light substantially greater than the critical angle, such as in the range of about 70 degrees to about 75 degrees.

The light guide unit 301 may guide a light emitted from the point light source 200 and emit the light through a portion of the light guide unit 301. Advantageously, the light emitted from the point light source 200 may have an improved luminance uniformity.

The light guide unit 301 includes the light incident portion 310, a light exiting portion 370, a counter portion 380, a first reflecting portion 330 and a second reflecting portion 350. The light incident portion 310 may constitute a side surface of the light guide unit 301 and may include three point light sources 200. However, any of a number and/or types of light sources may be used as is suitable for the purpose described herein.

A portion of the light incident portion 310 corresponding to the point light source 200 may include an optical diffusing pattern 311. The optical diffusing pattern 311 may diffuse an incident light. The light source 200 may be disposed over an entire area of the optical diffusing pattern 311 or may cover a part of the optical diffusing pattern 311.

The light exiting portion 370 may be connected to a first edge of the light incident portion 310. A guided light may exit from the light exiting portion 370. The counter portion 380 is opposite to the light exiting portion 370 and connected to a second edge of the light incident portion 310. The second edge of the light incident portion 310 is opposite to the first edge.

The first reflecting portion 330 may reflect a first light of a light entered through the light incident portion 310. The first reflecting portion 330 includes a first side surface 331 and a second side surface 333. The first side surface 331 may be substantially orthogonal to the light incident portion 310 and may connect the light exiting portion 370 to the counter portion 380. The second side surface 333 may be opposite to the first side surface 331, may be substantially orthogonal to the light incident portion 310 and may connect the light exiting portion 370 to the counter portion 380.

The second reflecting portion 350 may reflect a second light of a light entered through the light incident portion 310, in order to prevent the light leakage near the light incident portion 310 in parallel with the light incident portion 310. The second reflecting portion 350 is extended from the first reflecting portion 330 and is connected to the light incident portion 310. The second reflecting 350 includes a first round surface 351 and a second round surface 353.

The first round surface 351 is roundly extended from the first side surface 331 and is connected to a third edge of the light incident portion 310. The third edge may connect the first edge to the second edge of the light incident portion 310. The second round surface 353 is roundly extended from the second side surface 333 and is connected to a fourth edge of the light incident portion 310 that is opposite to the third edge. The first and the second round surfaces 351 and 353 may be convexly formed outside of the light guide unit 301.

Figure 4:
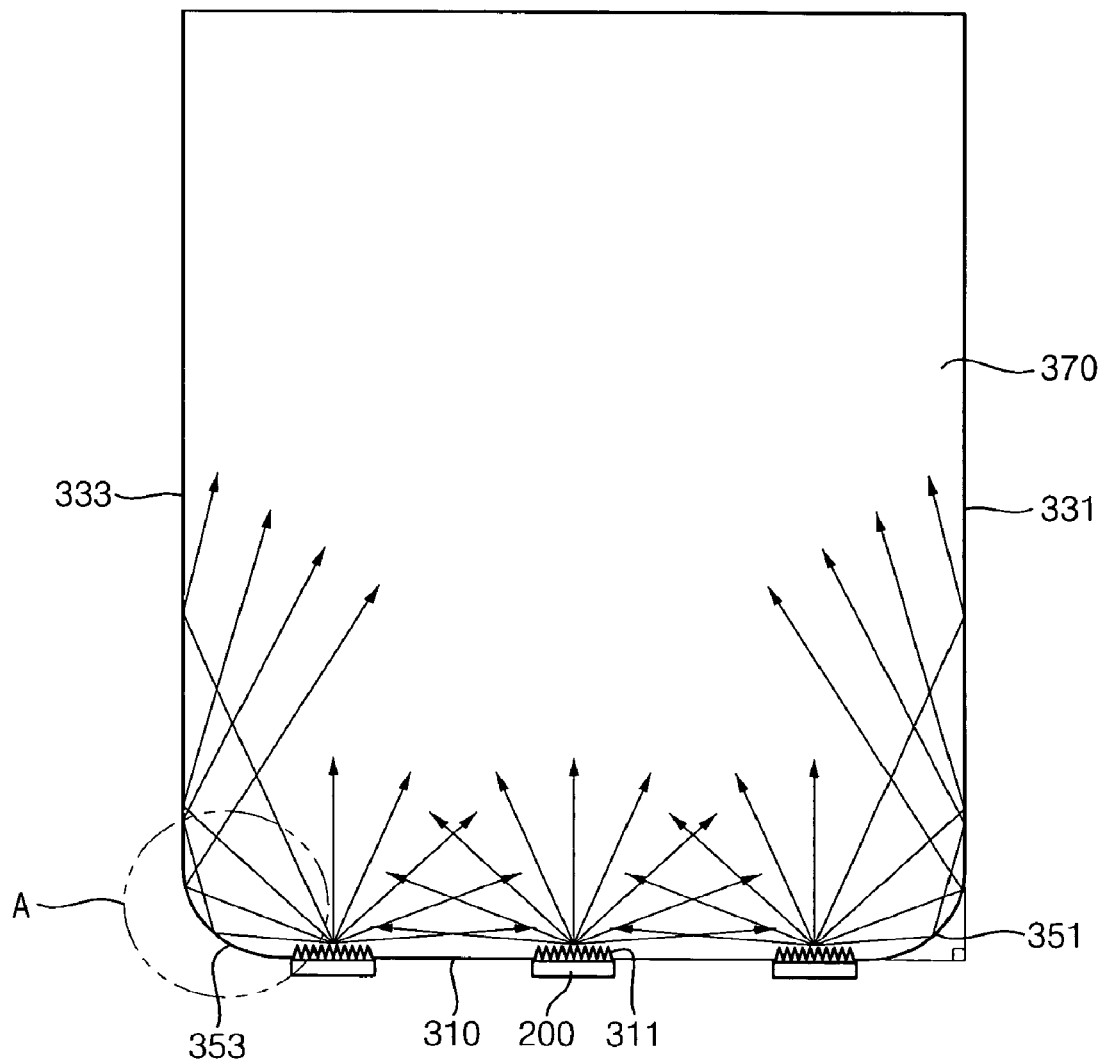
FIG. 4 is a plan view illustrating the backlight assembly illustrated in FIG. 3.

FIG. 4 is a plan view illustrating the backlight assembly illustrated in FIG. 3.

Referring to FIGS. 3 and 4, the first and second round surfaces 351 and 353 have curved figures or profiles having a predetermined curvature to increase an intensity of a light totally reflected from the first and second round surfaces 351 and 353.

Referring to FIG. 4, a light emitted from the point light source 200 may enter the light incident portion 310. An incident angle of a light emitted from the point light source 200 may be in a range of about 70 degrees to about 75 degrees in a direction substantially perpendicular to the light incident portion 310. The light is diffused by the optical pattern 311 formed on the light incident portion 310 and induced into the light guide unit 301.

The light induced into the light guide unit 301 may be repeatedly reflected at the first side surface 331, the second side surface 333, the first round surface 351, the second round surface 353, the light exiting portion 370 and/or the counter portion 380. When a condition for a light exiting is satisfied, the light exits through the light exiting portion 370.

In one exemplary embodiment, when the light guide unit 301 has a refractive index of about 1.59, a critical angle for effectively a total reflection at the first side surface 331, the second side surface 333, the first round surface 351, the second round surface 353, the light exiting portion 370 and the counter portion 380 is about 38 degrees. The light induced into the light exiting portion 370 with an incident angle of below about 38 degrees exits through the light exiting portion 370.

Figure 5:
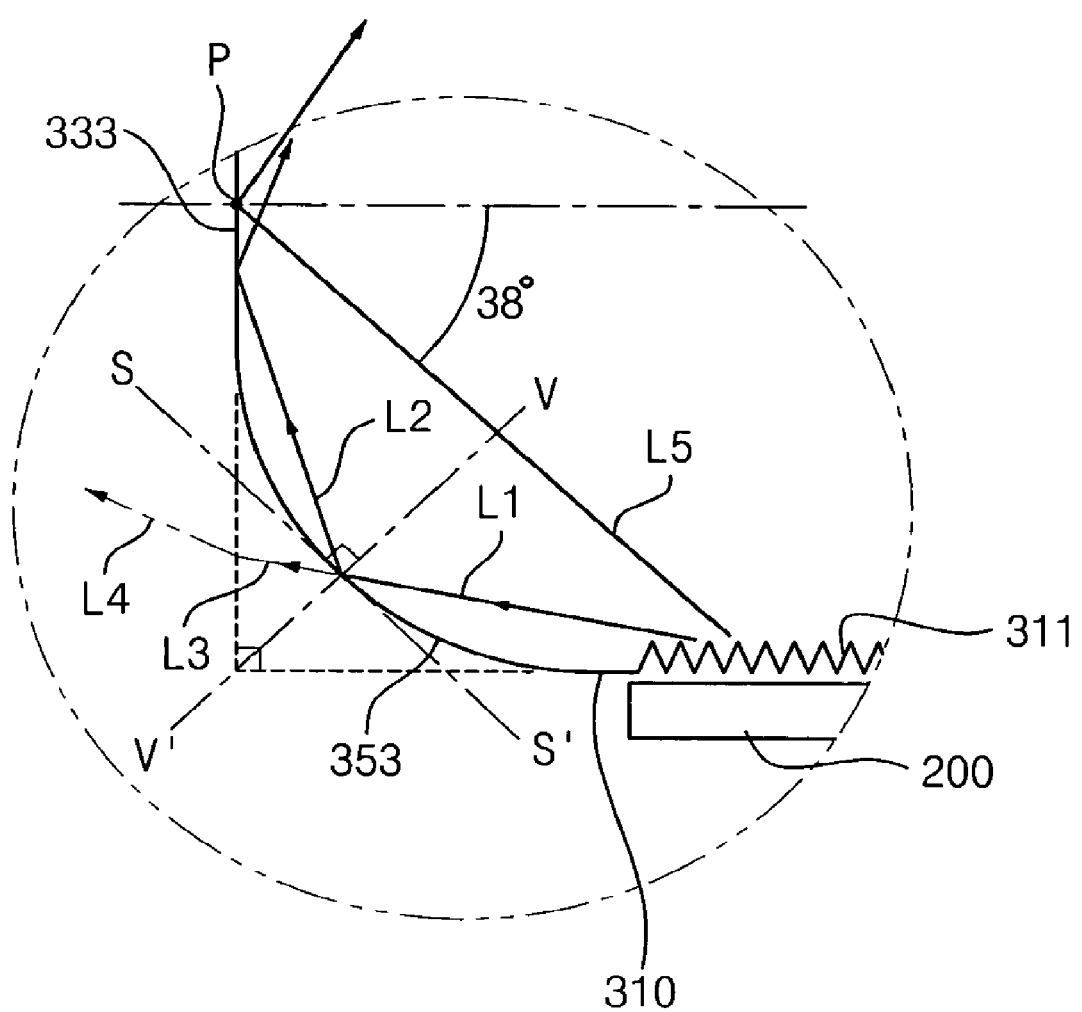
FIG. 5 is an enlarged plan view of 'A' illustrated in FIG. 4.

FIG. 5 is an enlarged plan view illustrating a 'A' of FIG. 4. In FIG. 5, line S-S' is a tangent line at a point of a second round surface 353 and line V-V' is substantially perpendicular at the point.

Referring to FIG. 5, when the second side surface 333 is orthogonal to the light incident portion 310 as a part shown in the dotted line, a light may go along a course of L1-L3-L4. Referring to the course of L1-L3-L4, an amount of a light incident to the second side surface 333 adjacent to the light incident portion 310 may not be totally reflected to the second side surface 333 and may escape to an outside of the light guide unit 301 through the second side surface 333.

In the part shown in the dotted line, the second side surface 333 is defined from an incident position P where a standard light L5 having an incident angle of about 38 degrees from the light incident portion 310 is incident up to a corner where the second side surface 333 and the light incident portion 310 may meet.

When the second side surface 333 is orthogonal to the light incident portion 310 as a part shown in the dotted line, a light that is leaked out through the second side surface 333 adjacent to the light incident portion 310 may be great.

An amount of light leakage may be due to geometric structures of the second side surface 333 and the light incident portion 310. A relatively large amount of light incident to the second side surface 333 may have incident angles below 38 degrees.

When the second side surface 333 is roundly connected to the light incident portion 310 through the second round surface 353 as in the illustrated exemplary embodiment, a light may go along a course of L1-L2. Referring to the course of L1-L2, most of the light incident to the second round surface 353 may be essentially totally reflected and may serve as a backlight of the backlight assembly 300. As illustrated in FIG. 5, because the second side surface 333 has a round figure, most of the light incident to the second side surface 333 may have incident angles of more than about 38 degrees, which is a critical angle for total reflection of the light.

A curvature or a figure of the second side surface 333 may be variously changed for an incident light to be totally reflected. In one exemplary embodiment, a profile of the second side surface 333 may be a portion of a circle or an oval. In another exemplary embodiment, a profile of the second side surface 333 may be a curve having a predetermined curvature.

Figure 6:
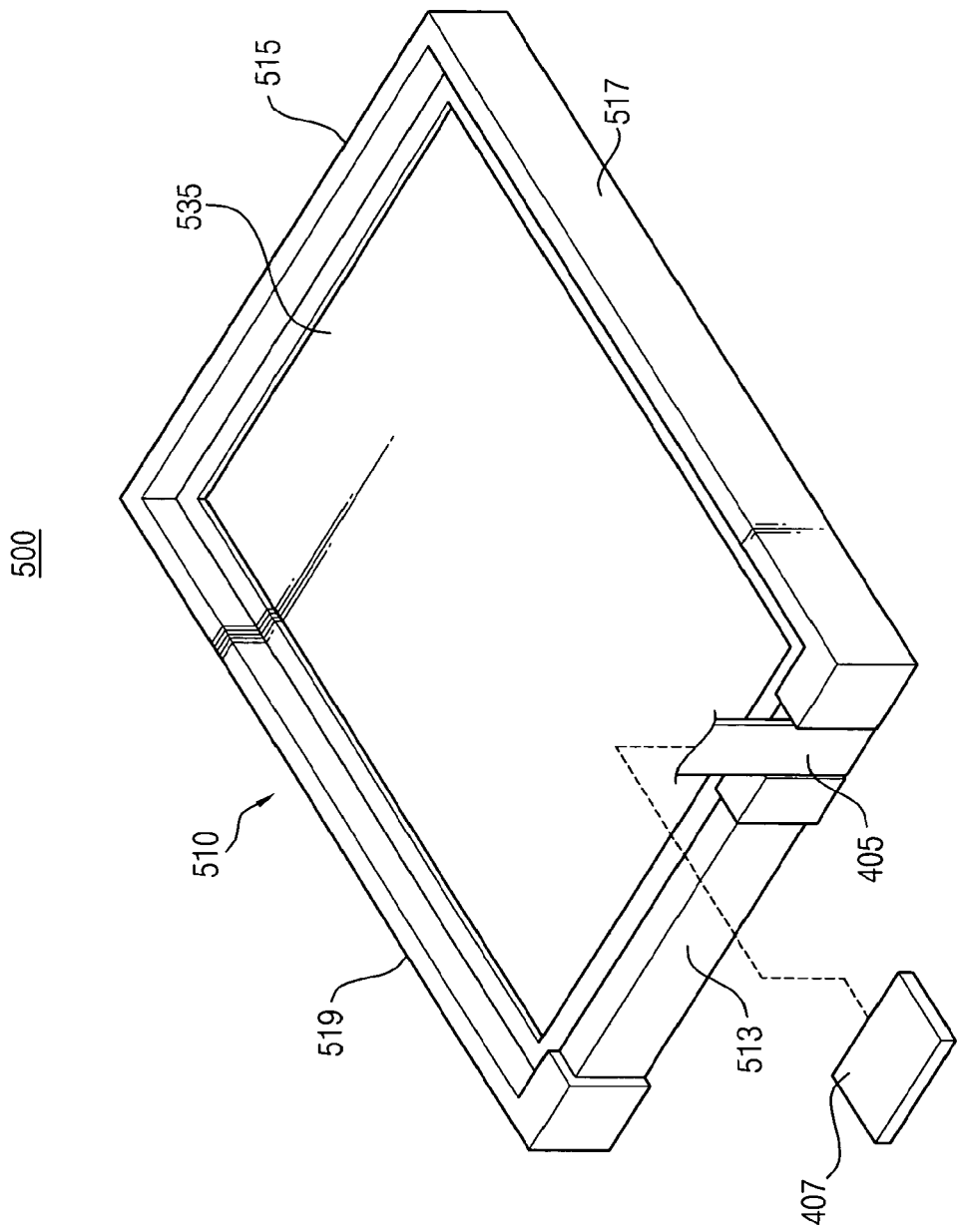
FIG. 6 is a perspective view illustrating another exemplary embodiment of a backlight assembly in accordance with the present invention.
Figure 7:
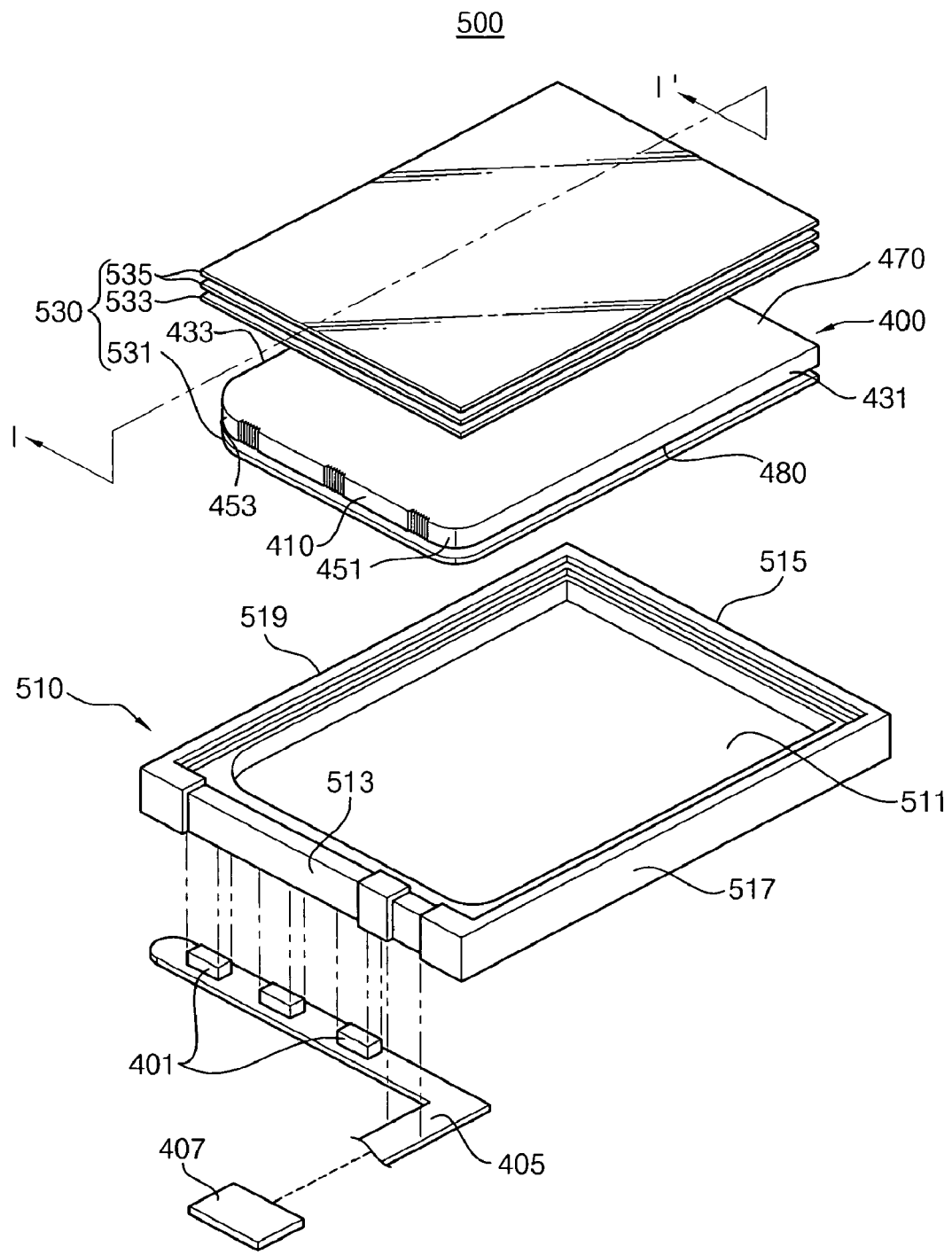
FIG. 7 is an exploded perspective view illustrating the backlight assembly illustrated in FIG. 6.

FIG. 6 is a perspective view illustrating another exemplary embodiment of a backlight assembly in accordance with the present invention. FIG. 7 is an exploded perspective view illustrating the backlight assembly in FIG. 6.

Referring to FIGS. 6 and 7, a backlight assembly 500 includes a light source 401, such as a light-emitting diode, a light guide unit 400, a flexible printed circuit board (FPCB) 405, a drive circuit part 407, a receiving container 510 and an optical sheet 530.

The light emitting diode 401 and the light guide unit 400 may be substantially the same as the point light source 200 and the light guide unit 301 described in FIGS. 3 to 5, respectively. Therefore, the same reference numerals denote the same elements, and detailed description thereof is omitted.

The light emitting diode 401 is mounted on the FPCB 405. The FPCB 405 may electrically connect the light emitting diode 401 to the drive circuit part 407. The drive circuit part 407 may supply a power source for driving into the light emitting diode 401 through the FPCB 405. The receiving container 510 includes a base 511 substantially in a planar or plate shape, a first sidewall 513, a second sidewall 515, a third sidewall 517 and a fourth sidewall 519.

In one exemplary embodiment, the baseplate 511 may include openings thereon to reduce a weight and a volume of the backlight assembly 500. The first sidewall 513, the second sidewall 515, the third sidewall 517 and the fourth sidewall 519 are disposed around the baseplate 511. The first sidewall 513 is disposed on an opposite side of the second sidewall 515. The third sidewall 517 is disposed on an opposite side of the fourth sidewall 519. The third and the fourth sidewalls 517 and 519 may connect the first sidewall 513 to the second sidewall 515, respectively.

Referring to FIG. 7, the first sidewall 513 may be roundly connected to the third sidewall 517 and corresponding in shape and/or dimension to a first round surface 451 of the light guide unit 400. The first sidewall 513 may be roundly connected to the fourth sidewall 519 each other corresponding to a second round surface 453 of the light guide unit 400.

A first stepped portion is formed on inner upper surfaces of the first sidewall 513 to the fourth sidewall 519. The optical sheet 530 may be disposed on the first stepped portion. In addition, a second stepped portion is formed on the inner upper surfaces of the first sidewall 513 to the fourth sidewall 519. The second stepped portion is formed at a position substantially higher than that of the first stepped portion relative to the baseplate 511.

Figure 8:
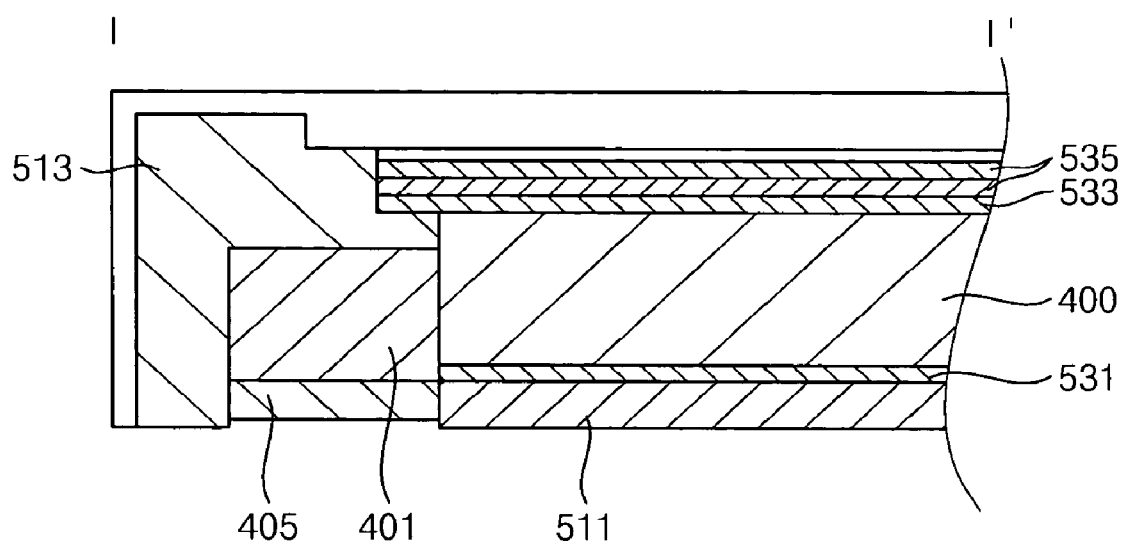
FIG. 8 is a cross sectional view illustrating the backlight assembly taken along line I-I' in FIG. 7.

FIG. 8 is a cross sectional view illustrating the backlight assembly taken along line I-I' in FIG. 7.

Referring to FIGS. 7 and 8, the first sidewall 513 may include a first groove in the first sidewall 513 to the baseplate 511. The baseplate 511 may include a second groove on the first sidewall 513 that may guide the FPCB 405.

The light emitting diode 401 mounted on the FPCB 405 is inserted in the first groove from back of the baseplate 511 as illustrated in FIG. 8. The FPCB 405 is guided along the second groove. A portion of the FPCB 405 may be bent enveloping or covering a portion of an outer surface of the first sidewall 513.

The optical sheet 530 may improve characteristics of a light emitted from the light guide unit 400, such as luminance uniformity or a front luminance. The optical sheet 530 may include, but is not limited to, a reflecting sheet 531, a diffusing sheet 533 and light condensing sheets 535.

The reflecting sheet 531, the light guide unit 400, the diffusing sheet 533 and the light condensing sheets 535 are successively mounted on the baseplate 511 of the receiving container 510. The reflecting sheet 531 and the light guide unit 400 are disposed in a receiving space defined by the first sidewall 513, the second sidewall 515, the third sidewall 517, the fourth sidewall 519 and the baseplate 511 of the receiving container 510. The diffusing sheet 533 and the light condensing sheets 535 are disposed at the first stepped portion formed on the first sidewall 513 to the fourth sidewall 519.

The reflecting sheet 531 is disposed on a counter portion 480 of the light guide unit 400. A light escaped from the counter portion 480 may be reentered into the counter portion 480 by the reflecting sheet 531. Advantageously, a light efficiency may be improved. In exemplary embodiment, the reflecting sheet 531 may have a shape substantially corresponding in profile and size to the counter portion 480.

The diffusing sheet 533 and the light condensing sheets 535 are successively mounted on a light exiting portion 470 of the light guide unit 400. The diffusing sheet 533 may diffuse a light exiting from the light guide unit 400 so the diffusing sheet 533 may improve a uniformity of luminance. The light condensing sheets 535 may be disposed to have different condensing directions. The light condensing sheets 535 may condense a diffusing light exiting from the diffusing sheet 533 to improve a luminance of a front.

A light incident portion 410 of the light guide unit 400 may correspond to the first sidewall 513 of the receiving container 510. A first side surface 431 of the light guide unit 400 may correspond to the third sidewall 517 of the receiving container 510. A second side surface 433 of the light guide unit 400 may correspond to the fourth sidewall 519 of the receiving container 510. The light emitting diode 401 may provide a light into the light incident portion 410 of the light guide unit 400.

Figure 9:
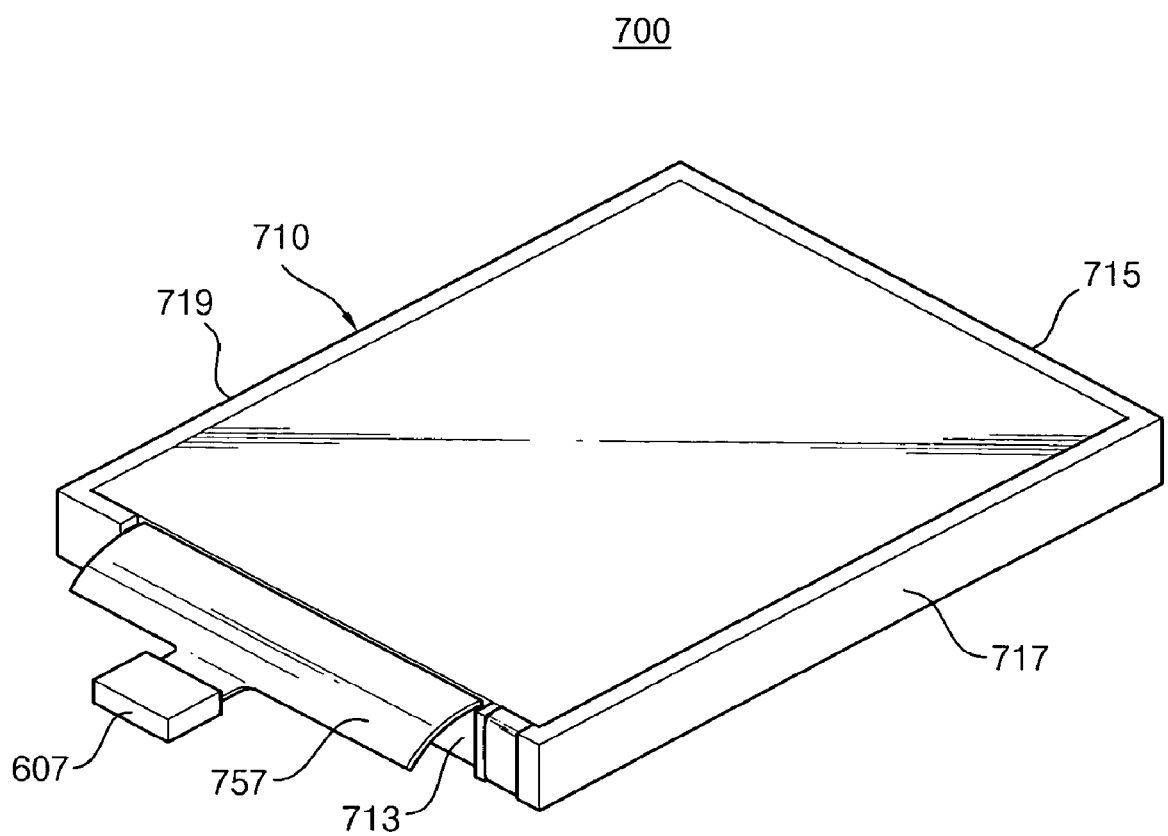
FIG. 9 is a perspective view illustrating an exemplary embodiment of a display device in accordance with the present invention.
Figure 10:
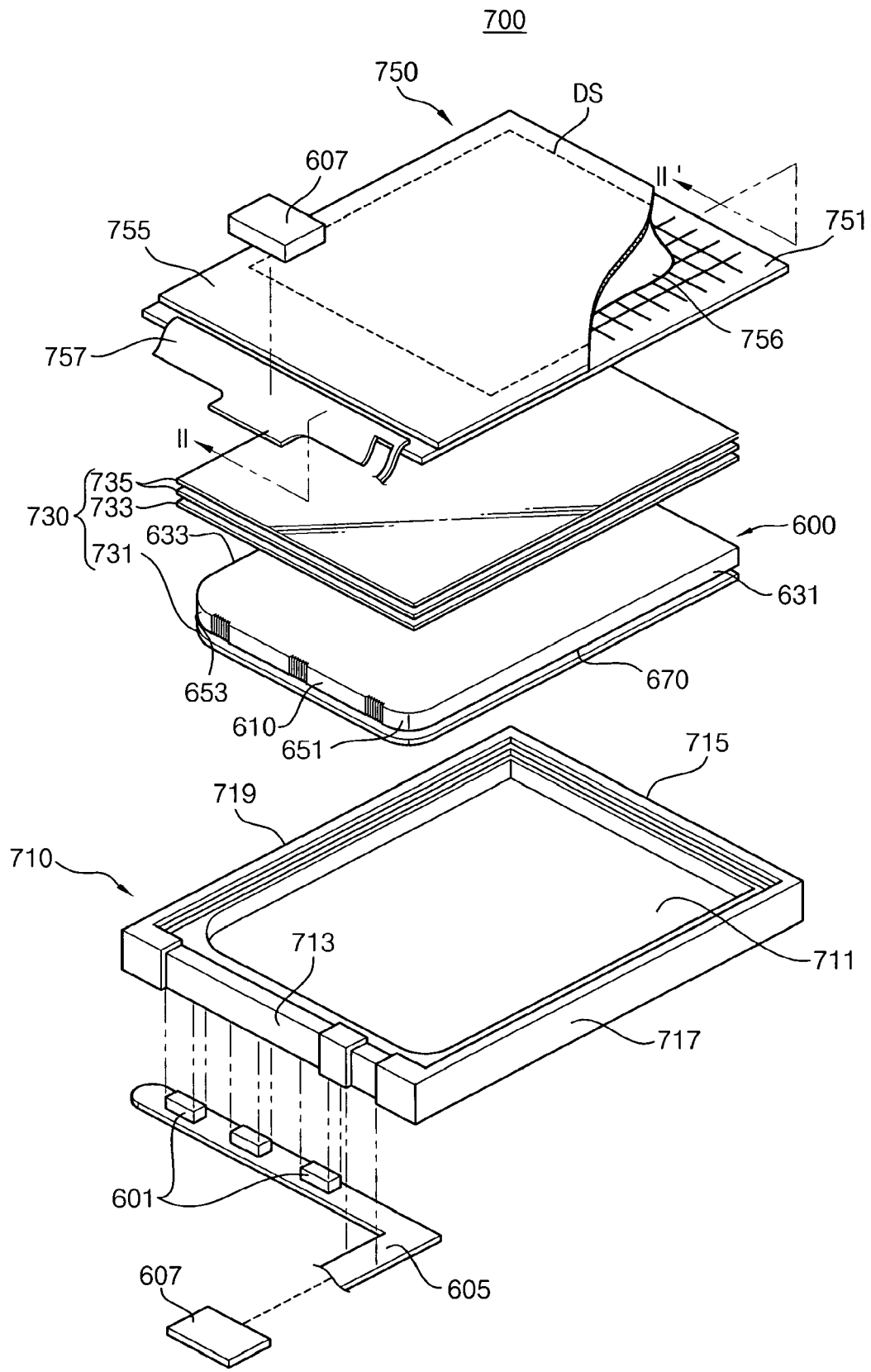
FIG. 10 is an exploded perspective view illustrating the display device illustrated in FIG. 9.

FIG. 9 is a perspective view illustrating an exemplary embodiment of a display device in accordance with the present invention. FIG. 10 is an exploded perspective view illustrating the display device of FIG. 9.

Referring to FIGS. 9 and 10, a display device 700 includes a light source 601, such as a light-emitting diode (LED), a light guide unit 600, a flexible printed circuit board (FPCB) 605, a driving circuit part 607, a receiving container 710, an optical sheet 730 and a display panel 750. Remaining structures except for the display panel 750 may be substantially the same as a light emitting diode 401, a light guide unit 400, a flexible printed circuit board 405, a driving circuit part 407, a receiving container 510 and an optical sheet 530 illustrated in FIGS. 6 to 8. Therefore, the same reference numerals denote the same elements, and detailed description thereof is omitted.

The display panel 750 may display images on a display section (DS) using a light emitted from the light emitting diode 601 and passing through the light guide unit 600 and the optical sheet 730. The display panel 750 includes a first substrate 751, a second substrate 755 and a liquid crystal layer 756.

The first substrate 751 may include a lower substrate, pixel electrodes and switching elements. The pixel electrodes may be formed on the lower substrate substantially in a matrix. The pixel electrodes may be transparent and conductive. The switching elements may supply a panel driving signal into the pixel electrode.

The second substrate 755 may include an upper substrate, color pixels and common electrodes. The upper substrate may be opposite the lower substrate and disposed apart from the lower substrate. The color pixels may be disposed on the upper substrate corresponding to the pixel electrodes. The color pixels may pass a light having a predetermined wavelength of an emitted light. The common electrodes may be disposed on the upper substrate corresponding to the pixel electrodes. The common electrodes may include a transparent and conductive material.

The display device 700 may further include a panel flexible printed circuit board (FPCB) 757. The panel FPCB 757 may be electrically connected to an edge of the first substrate 751. The driving circuit part 607 is mounted on the panel FPCB 757. The driving circuit part 607 may substantially drive the display device 700. The driving circuit part 607 may apply a panel driving signal including a data signal and a control signal for driving the display panel 750 to the panel flexible printed circuit board 757. Additionally, the driving circuit part 607 may apply a power source for driving the light emitting diode 601 to the FPCB 605 electrically connected to the panel FPCB 757.

When an electric field is generated between the pixel electrodes and the common electrodes according to the panel driving signal applied from the driving circuit part 607, the liquid crystal layer 756 between the pixel electrodes and the common electrodes may be rearranged. A transmissivity of light supplied to the display panel 750 from the optical sheet 730 may be changed, so the display device 700 may display images having a required gradation.

Figure 11:
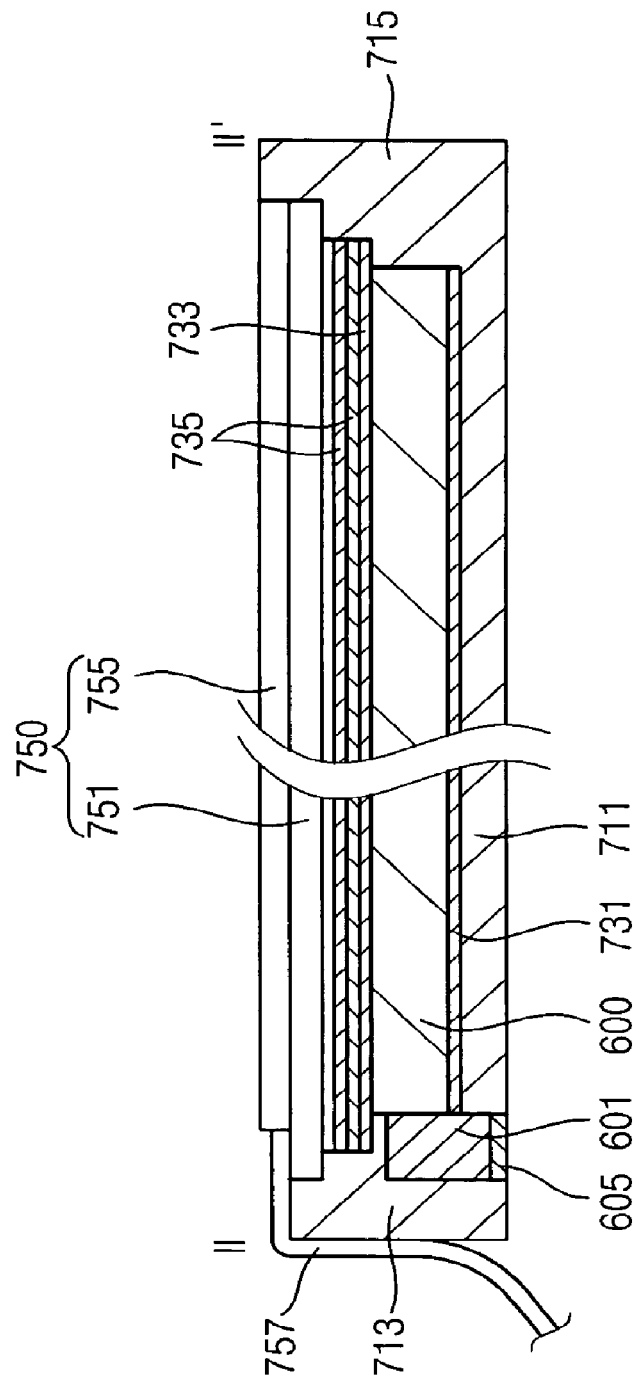
FIG. 11 is a cross sectional view illustrating the display device taken along line II-II' in FIG. 10.

FIG. 11 is a cross sectional view illustrating the display device taken along line II-II' in FIG. 10.

Referring to FIGS. 10 and 11, a reflecting sheet 731, a light guide unit 600, a diffusing sheet 733 and a light condensing sheet 735 are successively disposed on a baseplate 711 of a receiving container 710.

A first sidewall 713 of the receiving container 710 is roundly connected to a third sidewall 717 and corresponds to a first round surface 651 of the light guide unit 600. The first sidewall 713 of the receiving container 710 is roundly connected to a fourth sidewall 719 corresponding to a second round surface 653 of the light guide unit 600.

The baseplate 711, the reflecting sheet 731 and a counter portion 670 of the light guide unit 600 may have substantially the same shape. The diffusing sheet 733 and the light condensing sheet 735 may be supported by a first stepped portion formed on inner sidewalls of the first sidewall 713, a second sidewall 715, the third sidewall 717 and the fourth sidewall 719 of the receiving container 710.

Figure 12:
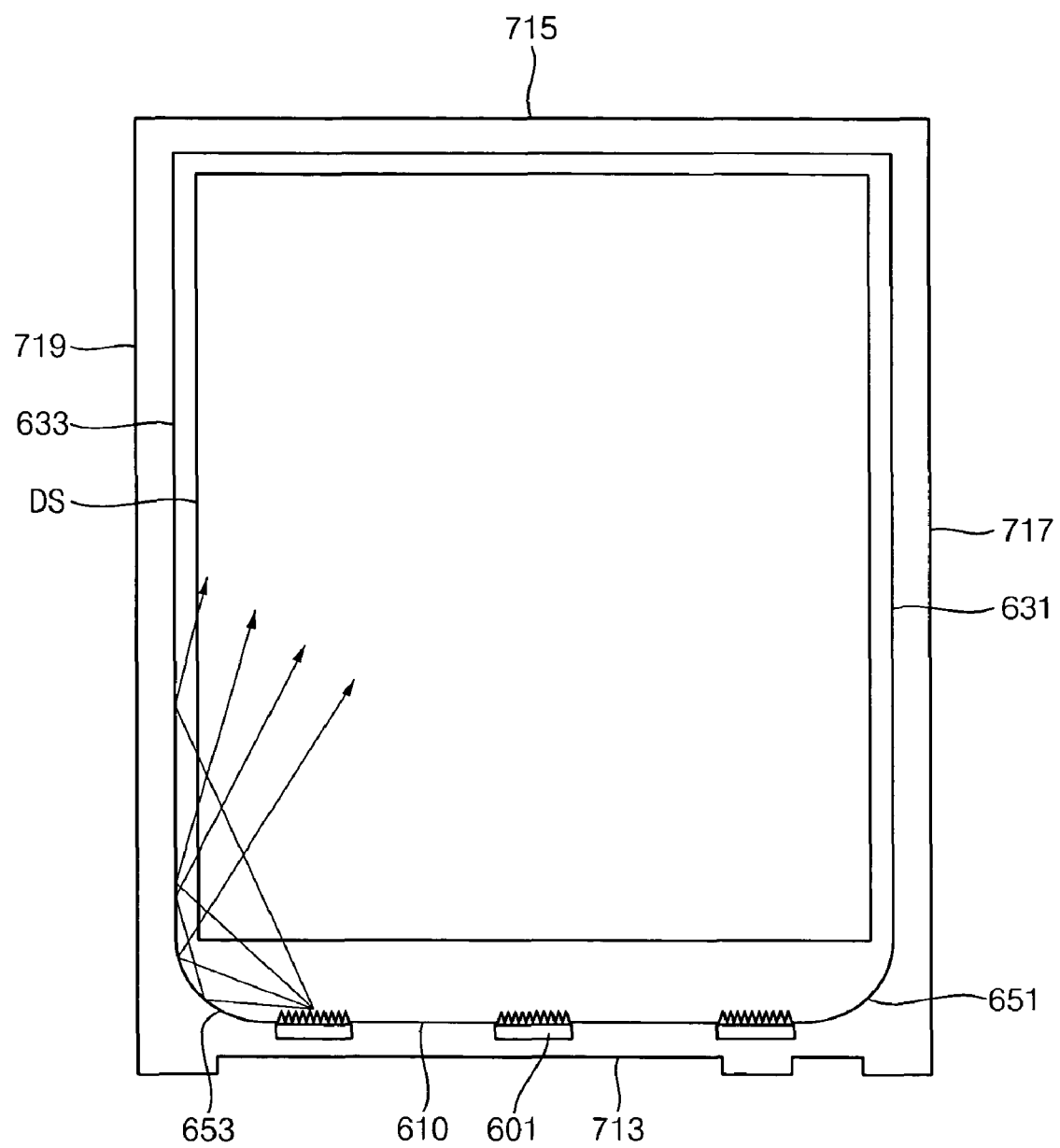
FIG. 12 is a plan view illustrating the display device illustrated in FIG. 10.

FIG. 12 is a plan view illustrating the display device in FIG. 10. Particularly, FIG. 12 illustrates an arrangement between a display section and a light guide unit.

Referring to FIGS. 10 to 12, the display panel 750 is disposed on a second stepped portion formed on the first sidewall 713, the second sidewall 715, the third sidewall 717 and the fourth sidewall 719. The light emitting diode 601 of the light guide unit 600 is disposed apart by a predetermined interval from the display section (DS).

A difference of luminance between a region adjacent to the light emitting diode 601 in the DS and another region in the DS may be reduced. Since the light incident portion 610 is disposed on an outside of the DS, the first and the second round surfaces 651 and 653 are also disposed on the outside of the DS.

The first and the second round surfaces 651 and 653 may guide a light leaked into a first side surface 631 and a second side surface 633 of the light guide unit 600 around the light incident portion 610 to lead the light into the DS.

In an illustrated exemplary embodiment a leakage of a light emitted from a point light source may be reduced or effectively prevented because of a shape of a light guide unit. The light guide unit may have a round-shaped corner where a light incident portion and a sidewall may meet. The light guide unit including the round-shaped corner may reduce or effectively prevent a light from a leakage into the sidewall adjacent to the light incident portion, so that a light efficiency may be improved.

In an exemplary embodiment, a luminance of a backlight assembly including the light guide unit may be improved. Advantageously, a power consumption of the backlight assembly may be reduced and a quality of a display device including the backlight assembly may be improved.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display device comprising:
    a light source emitting a light;
    a display panel having a display section where an image is displayed using the light;
    a light guide unit comprising:
        a light incident portion where the light emitted from the light source enters;
        a first reflecting portion reflecting a first light of an incident light entered through the light incident portion; and
        a second reflecting portion disposed at a region corresponding to an outside of the display section and between the light incident portion and the first reflecting portion, to connect the first reflecting portion to the light incident portion and reflect a second light of the incident light, the second reflecting portion being disposed inside an imaginary corner where an imaginary extension of the light incident portion and an imaginary extension of the first reflecting portion rectangularly intersect; and
    a receiving container receiving the light guide unit, the receiving container including at least one connecting sidewall having a shape corresponding to a shape of the second reflecting portion of the light guide unit.

2. The display device of claim 1, wherein the second reflecting portion has a convexly round shape.

3. The display device of claim 2, wherein the connecting sidewall of the receiving container has a convexly round shape corresponding to the shape of the second reflecting portion.

4. The display device of claim 1, wherein the light guide unit further includes:
    a light exiting portion exiting a guided light, the light exiting portion connected to the light incident portion, the first reflecting portion and the second reflecting portion; and
    a counter portion opposite to the light exiting portion.

5. The display device of claim 4, wherein the first reflecting portion comprises a first side surface and a second side surface, the first and second side surfaces being opposite to each other and connecting the light exiting portion to the counter portion, and
    wherein the second reflecting portion comprises a first round surface connecting the first side surface to the light incident portion and a second round surface connecting the second side surface to the light incident portion.

6. The display device of claim 5, wherein the first and the second round surfaces have profiles totally reflecting a light entered through the light incident portion and directly incident into the first and second round surfaces.

7. The display device of claim 5, wherein the receiving container comprises:
    a first sidewall facing the light incident portion of the light guide unit;
    a second sidewall disposed on an opposite side of the first sidewall;
    a third sidewall connecting the first sidewall to the second sidewall; and
    a fourth sidewall disposed on an opposite side of the third sidewall.

8. The display device of claim 7, wherein the receiving container further comprises:
    a first connecting sidewall connecting the first sidewall to the third sidewall, the first connecting sidewall having a round shape corresponding to a shape of the first round surface of the light guide unit; and
    a second connecting sidewall connecting the first sidewall to the fourth sidewall, the second connecting sidewall having a round shape corresponding to a shape of the second round surface of the light guide unit.

9. The display device of claim 7, wherein the first sidewall includes a groove, and the light source is inserted in the groove of the first sidewall.

10. The display device of claim 7, further comprising an optical sheet received by the receiving container.

11. The display device of claim 10, wherein a stepped portion is formed on inner upper surfaces of the first sidewall to the fourth sidewall, and the optical sheet is disposed on the stepped portion.

12. The display device of claim 1, wherein the light source includes a plurality of point light sources.

13. The display device of claim 12, wherein the light incident portion includes a plurality of optical patterns diffusing the incident light, the optical patterns facing each of the point light sources.

14. The display device of claim 12, wherein each of the optical patterns includes a prism pattern.

* * * * *